(No Model.)

J. S. HATTERY.
COUPLING FOR GAS OR OTHER PIPES.

No. 412,255. Patented Oct. 8, 1889.

Attest:
Will. A. Norton
R. H. Lacey

Inventor:
Joseph S. Hattery,
by John J. Halsted Jr.
his Attys.

UNITED STATES PATENT OFFICE.

JOSEPH S. HATTERY, OF WATERLOO, IOWA.

COUPLING FOR GAS OR OTHER PIPES.

SPECIFICATION forming part of Letters Patent No. 412,255, dated October 8, 1889.

Application filed April 1, 1889. Serial No. 305,513. (No model.)

*To all whom it may concern:*

Be it known that I, JOSEPH S. HATTERY, of Waterloo, in the county of Black Hawk and State of Iowa, have invented certain new and useful Improvements in Couplings for Gas and other Pipes; and I do hereby declare that the following is a full, clear, and exact description of the invention, which will enable others skilled in the art to which it appertains to make and use the same, reference being had to the accompanying drawings and to letters of reference marked thereon, which form a part of this specification.

My invention relates to pipe-fittings and to pipes connected therewith, and while useful for many other purposes it is more particularly intended for positively preventing explosions of gas, either natural or manufactured, of high or low pressure, and especially of natural gas, which, as is well known, upon boring down into the ground until it is reached, rises with immense pressure. To pipe this gas and hold it safely within control, so that it may be prudently used for fuel for steam, for blast-furnaces, rolling-mills, &c., as well as for domestic use for heating and illuminating, has been and yet is a difficult problem. Specially extra heavy pipe is now generally used for the purpose, but it has been found actually impossible to prevent leakage and consequent explosions.

It is the object of my invention to prevent these disastrous results and to render gas, whether natural or manufactured, as safe in a residence or elsewhere as are the pipes which supply water.

To this end my invention consists, mainly, in a special construction of fittings—that is, of couplings, elbows, T's, crosses, or other pipe-connections—not only made very heavy and strong, but also adapted for two lines of pipe placed one within the other, and made integrally with a chamber or passage, whereby any leakage of gas from the inner and heavier pipe leading up from the well may be carried off and led either to a point where it may be used or to any high point where it may harmlessly escape—as, for instance, above the top of a building.

Figure 1:
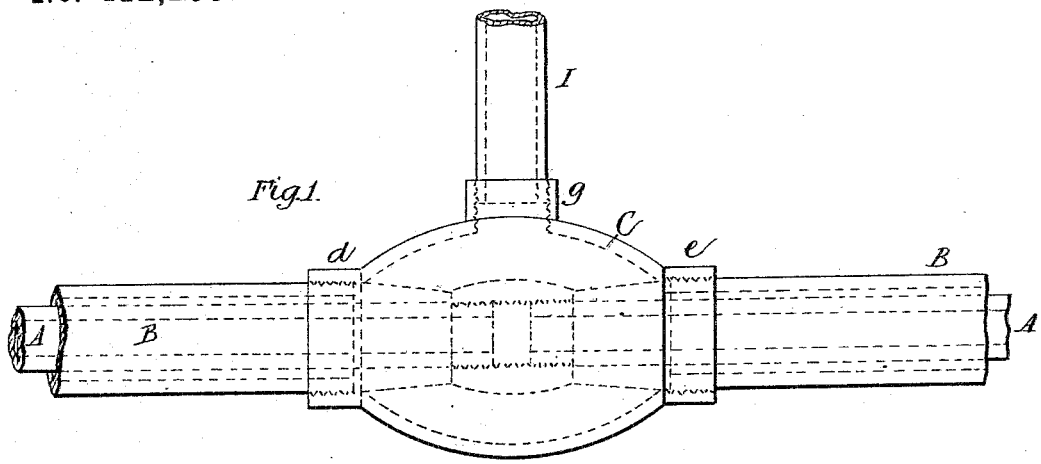
Figure 2:
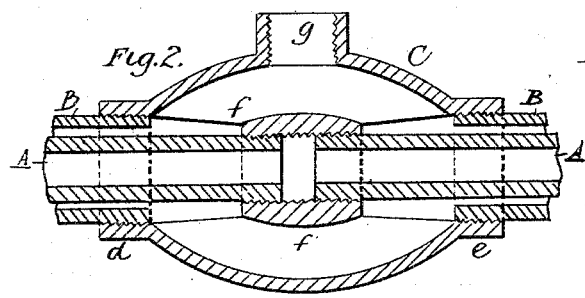
Figure 3:
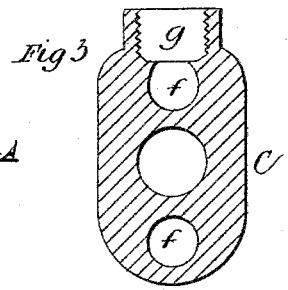
Figure 6:
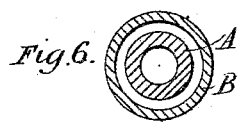
Figure 4:
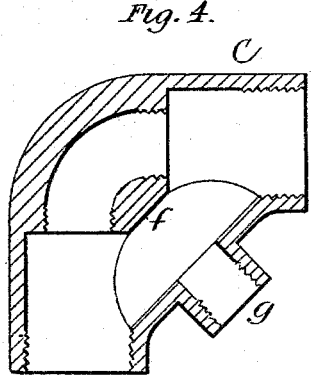
Figure 5:
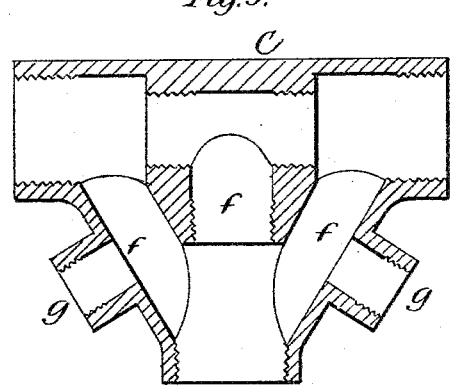

In the drawings, Figure 1 shows in elevation one of my improved couplings with sections of pipe jointed thereto; Fig. 2, a central longitudinal vertical section of the coupling shown in Fig. 1; Fig. 3, a central cross vertical section of the same. Figs. 4 and 5 show central longitudinal vertical sections of two other styles of couplings; Fig. 6, a cross-section of the double pipe.

I make the inner or main pipe A, which is to convey the gas from the well, very heavy and strong, so that it may be able to withstand the greatest known pressure of the gas which it conveys without bursting. This entire line of pipe is then inclosed within another one B, larger but not needing to be so strong, leaving between the exterior of A and the interior of B ample space to receive and carry off any gas that may escape or leak from the joints or defects in A. The pipe A receives the full pressure of the gas-well—and here I would remark that the mere inclosing of one line of pipe within another line I am aware has been practiced before, but not so far as I am aware with the inner pipe relatively much thicker and stronger than its surrounding one, and also with couplings or fittings such as I am now about to describe, and which constitute the leading or most essential part of my invention.

My improved fittings C are adapted for coupling or connecting together the ends of both the inner and the outer pipes A and B, and such fittings not only have both of their threaded and pipe-jointing portions $d\,e$ made integral with the body of the fitting C, so as to be permanently fixed therein without the need of screws, pins, or other fastenings, but each fitting is also provided with a chamber $f$, serving to receive or collect any gas that may leak from the inner pipe into the outer one to prevent its escaping, and to insure its safe-conduct to any desired place for use or otherwise. Thus each fitting, whatever may be the well-known or needed shape of the fitting—that is, whether they are mere couplings, or are elbows, H's, L's, T's, crosses, or of any other exterior form that exigencies may require—are each and all under my invention made not only adapted to receive the larger and smaller pipe-sections—one within the other—and also strong and thick enough to prevent bursting from the greatest interior pressure, but each has also its own chamber or passage $f$, made within and forming part of it, and the added part of the metal in which such by-pass is made also adds proportionately to the already great strength of the fitting, while this strength is also further enhanced by the interior jointing portion $d$, which makes the fitting at that part so much thicker and re-enforces it transversely at its central part and for a considerable portion of its length.

Of course it will be understood that the chamber or passage $f$ is not merely the annular continuation of the space between two concentric pipes, but that it is a special passage made in the fitting and leading from such space.

For the safe escape of any gas which might leak from any of the screwed joints of the interior pipe A, each fitting is preferably made with an outlet $g$, to be connected with any suitable outer pipe I, which may terminate, as desired, with an open upper end above the roof of a house, to let off the escaped gas harmlessly into the atmosphere, or this pipe I may lead the escaped gas, which, of course, has a relatively low pressure, to any point where it may be utilized for heating or illuminating.

Either the outer or the inner pipe may be tapped in order to take gas for illuminating or for heating.

I claim—

1. A fitting or coupler for connecting together two pipe-lines placed one inside the other, having the threaded portions or sockets for connection with both pipes made integral with such coupler, and having an outlet leading from the chamber constituting the space between the pipes, such chamber communicating with the outer line of pipes, all substantially as set forth.

2. In combination with a double pipe-line composed of one line of pipe surrounding another inner and stronger main pipe, a fitting or coupler having independent sockets into which the sections of both sets of pipes are threaded, and also having within it a chamber or passage communicating with the outer line of pipe and having an outlet serving to convey away any leakage from the inner pipe, all substantially as and for the purposes set forth.

JOSEPH S. HATTERY.

Witnesses:
 FRANK A. TYLER,
 J. ALSCHULER.